United States Patent [19]

Stevens

[11] 4,314,892
[45] Feb. 9, 1982

[54] MECHANICAL DAMAGE RESISTANT MEMBERS AND ELECTRO-PLATING RUBBER OR RUBBER-LIKE MATERIAL

[75] Inventor: James W. Stevens, Hatfield, United Kingdom

[73] Assignee: British Aerospace, Weybridge, England

[21] Appl. No.: 103,154

[22] Filed: Dec. 13, 1979

[30] Foreign Application Priority Data

Dec. 14, 1978 [GB] United Kingdom ............... 48446/78
Sep. 6, 1979 [GB] United Kingdom ............... 30986/79

[51] Int. Cl.³ .......................... C25D 5/00; C25D 5/54
[52] U.S. Cl. ..................................... 204/38 B; 204/30
[58] Field of Search ....................... 204/38 B, 3, 9, 20, 204/23, 30; 428/625, 465

[56] References Cited

U.S. PATENT DOCUMENTS

| | | | |
|---|---|---|---|
| 1,527,241 | 2/1925 | Warren | 204/30 |
| 2,637,404 | 5/1953 | Bart | 428/625 |
| 2,837,772 | 6/1958 | Deakin | 204/38 B |

FOREIGN PATENT DOCUMENTS

| | | | |
|---|---|---|---|
| 554341 | 6/1943 | United Kingdom . | |
| 626428 | 7/1949 | United Kingdom | 204/38 B |
| 775371 | 5/1957 | United Kingdom . | |
| 902412 | 7/1962 | United Kingdom . | |
| 938365 | 10/1963 | United Kingdom . | |
| 979779 | 1/1965 | United Kingdom . | |
| 1168874 | 10/1969 | United Kingdom . | |
| 1210554 | 10/1970 | United Kingdom . | |
| 1400600 | 7/1975 | United Kingdom . | |

*Primary Examiner*—Howard S. Williams
*Attorney, Agent, or Firm*—Cushman, Darby & Cushman

[57] ABSTRACT

A mechanical damage resistant member, e.g. a leading edge sheath for a propeller blade, comprises a substrate made of electrically conductive rubber or rubber-like material which has had an electrically conductive material layer, e.g. a layer of metal powder, pressed into its surface while the rubber is cured, the substrate then being electro-plated over the conductive layer. This method of electro-plating rubber and rubber-like material has general application, i.e. not just in relation to the described damage resistant member.

17 Claims, 4 Drawing Figures

U.S. Patent  Feb. 9, 1982  4,314,892
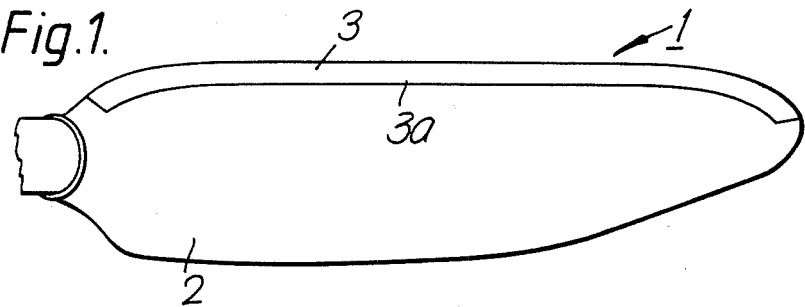
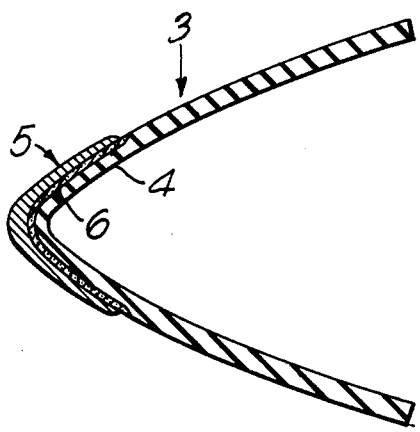
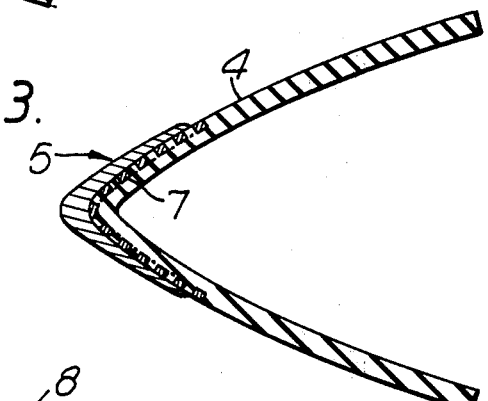
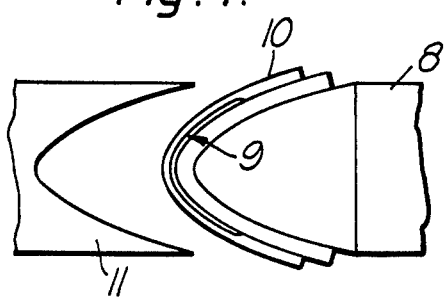

MECHANICAL DAMAGE RESISTANT MEMBERS AND ELECTRO-PLATING RUBBER OR RUBBER-LIKE MATERIAL

This invention relates to mechanical damage resistant members. More particularly but not exclusively it relates to an erosion resistant cover for the leading edge of a propeller blade. The invention also relates to a method of electro-plating a member made of curable rubber or rubber-like material.

The leading edge of a propeller blade is vulnerable to damage and erosion due for example to abrasive dust and water vapour carried in the atmosphere through which the blade is moving at high speed when the propeller rotates. This is particularly but not exclusively true of propeller blades for craft such as a Hovercraft as opposed to aircraft since a Hovercraft stays down near the ground where the atmosphere may be more abrasive than it is higher up, especially in desert regions.

A large Hovercraft propeller is far too expensive an item for it to be discarded after the relatively short time it takes for its blade leading edges to become dangerously eroded and so it has been proposed to sheath these edges with some relatively easily replaceable protective cover. A practicable way of fixing such a cover is by the use of adhesives but to get a sufficiently strong adhesive bond having regard to the very large centrifugal forces which act on the cover when the propeller rotates, the cover has to be extremely well fitted to the propeller blade since even a small void or clearance between the blade and the cover will eventually be spread by the pressure acting on the cover over the void and lead to failure. Such a good fit would not be obtainable with a protective cover made wholly of rigid material particularly because the cover may be needed for fitting to the propeller blade of a Hovercraft which is in service in a distant part of the world and of which, because it has been in service, the blade may have been somewhat deformed from its original shape, for example its leading edge may have become irregularly worn. For this reason, we have used for Hovercraft propeller blades a protective cover made of synthetic rubber which is made at least approximately to the shape of the leading edge of the blade but which, when it is glued to that edge, can be pressed into place to ensure that no voids and unbonded areas are left. Such a rubber protective cover can be very satisfactorily attached to the blade but its useful lifetime is somewhat limited. Accordingly, it is one object of this invention to provide a protective cover, for use in situations such as that described where the leading edge of the blade has deteriorated, of which the useful lifetime is substantially improved. With a view to obtaining such an improvement, we have tried electroplating the rubber, which was made electrically conductive by the inclusion in its composition of a conductive filler material, with an erosion resistant metal such as nickel. However, except by the improved method of electro-plating rubber or rubber-like material of which it is a further object of this invention to provide, it was not found possible, economically, to provide a sufficiently thick and hard plating with a sufficiently strong bond between the plating and the rubber. It will be appreciated that this improved method may have application in other fields of use where rubber or rubber-like material is to be metal plated i.e. not just in the manufacture of a mechanical damage resistant member.

According to one aspect of the invention there is provided a method of electro-plating curable electrically conductive rubber or rubber-like material wherein an electrically conductive layer is applied to a surface of the curable material, then the layer is pressed onto said surface and the curable material is cured, the layer having a discontinuous surface adjacent said surface of said curable material such that portions of the conductive material protrude into the curable material and the layer is bonded to the curable material, and then the curable material is electro-plated over said layer.

According to another aspect of the invention there is provided a mechanical damage resistant member, for example an erosion resistant cover for the leading edge of a propeller blade, the member being made of curable electrically conductive rubber or rubber-like material having thereon metal plating and the member having been made by applying an electrically conductive material layer to a surface of said curable material, then pressing said layer onto said surface and curing the curable material, the layer having a discontinuous surface adjacent said surface of said curable material such that portions of the conductive material protrude into the curable material and the layer is bonded to the curable material, and then electro-plating the curable material over said layer.

By way of example, the layer of electrically conductive material may comprise metal, for example copper powder (which is preferred), metal gauze or a perforated lamina, or it may comprise carbon cloth.

For a better understanding of the invention and to show how the same may be carried into effect, reference will now be made, by way of example, to the accompanying drawings, in which:

FIG. 1 is a plan view of a propeller blade to the leading edge of which there has been fitted a protective cover, FIG. 2 is a sectional view of the cover of FIG. 1, FIG. 3 is a sectional view of a modification of the protective cover, and FIG. 4 is a view of part of a mandrel and matching die used for making the cover of FIG. 2.

Referring to FIG. 1, the leading edge 1 of a Hovercraft propeller blade 2 is protected against erosion due to water vapour, dust and such by a preformed protective cover 3 which is roughly U or V-shaped in cross-section. The cover fits over the leading edge 1 and its flanks 3a, only one of which can be seen in FIG. 1, extend back a short distance over the respective faces of the blade. The cover is bonded to the blade by a suitable adhesive for example an epoxy resin glue.

As shown in FIG. 2, the cover 3 comprises a substrate 4 made of synthetic rubber to the leading edge region of which there has been applied a plating of nickel 5. The cover is made by taking a strip of uncured or partially cured synthetic rubber which has been made electrically conductive by the inclusion in its composition of a conductive filler material such as carbon black and applying to the surface of the strip a coating 6 of copper powder. Instead of synthetic rubber, natural rubber or a rubber-like material such as plasticized resin may be used for the substrate 4. The coating of copper powder is then pressed into the surface of the strip while heating the strip to cure it. The particles of copper thus become integral with the surface of the strip and strongly bonded thereto. The cured strip is then electro-plated with the nickel over the copper powder coating. As may be seen the nickel plating stops short of the extremities of the copper powder coating. Prior to the nickel plating, a flash-plate of copper (not shown) may be applied to the copper powder coating.

Instead of a coating of copper powder there could be applied to the surface of the uncured rubber strip fine copper gauze 7 as shown in FIG. 3, the gauze being pressed into the surface of the rubber strip 4 while the strip is cured and the nickel plating 5 then applied as before with or without an initial flash plate of copper. Instead of gauze, carbon cloth or a perforated metal lamina (not shown) might be used or any other kind of layer of electrically conductive material having a suitable texture such that portions of the material can protrude into the surface of the uncured rubber and hence become strongly bonded thereto during the curing process.

In more detail, one method of making the edge protector of FIG. 2, comprises first cutting a suitably shaped strip from a sheet of uncured electrically conductive synthetic rubber. Then, as shown in FIG. 4, the strip is deformed around a mandrel 8 having a profile similar to the leading edge of the propeller blade 2. A liberal coating of irregularly shaped copper powder is then applied to an area over and on each side of the portion of the strip which is later to be plated. Any excess copper powder is then allowed to fall off the strip so as to leave a uniformly distributed coating 9 of the powder.

It is preferred that a solvent such as Naptha is applied to the rubber surface before or with the copper powder so as to make the surface sticky and hence more likely to retain a uniform coating of the powder. However, depending upon the particular materials used, it may be sufficient to rely on the natural surface attraction between the rubber and the copper powder to give this uniform coating. A release film 10 is then laid over the strip and fixed in place for example with adhesive tape. The release film is such that it will not stick to the copper powder and will help to produce a shiny surface to the copper powder layer after this has been pressed into the rubber. The film may comprise Capron for example. There may be interposed between the mandrel 8 and the rubber strip 4 a layer of peel ply (not shown) which is a kind of cloth known in the art and which facilitates removal of the strip from the mandrel after curing and which also leaves a textured inner surface to the strip and hence enables a better glue bond to be obtained between the strip and the propeller blade. A die 11 having a concave face matching the profile of the mandrel 8 is then applied to the mandrel 8 with the rubber strip and copper powder layer between them, the mandrel and the die are pressed together by a curing press (not shown) and the rubber is cured, for example by placing the press in an autoclave (not shown). During this operation, the copper powder is pressed into the rubber surface and becomes integral with it and hence strongly bonded to it.

After curing, the rubber strip is removed from the mandrel 8 and a flash plating of copper is applied by electrolysis over the copper powder coating. Finally the required electrolytic plating of nickel is applied. During the nickel plating, known techniques may be employed to build up the nickel layer to a greater thickness over the portion of the rubber which will go over the actual leading edge of the propeller blade and to progressively reduce in thickness moving away from the leading edge on the two sides thereof as shown in FIG. 2. For example, the leading edge covering portion may have a thickness of about 0.050 inches and the plating may taper down to say 0.010 inches at the extremities of the plating. The greatest thickness does not have to be over the leading edge of the blade. Instead, the erosion patterns of different designs of blade may be taken into account and the plating thickness adapted to these patterns. For example, for a blade of which one side of the leading edge region has a substantially greater camber than the other, most or all of the erosion may occur on that one side and so the plating may have its greatest thickness here. On the other side, the plating may be relatively thin or even non-existent i.e. it may be possible for the plating to extend only from the leading edge over the side subject to the erosion.

Particularly where the edge protecting strip does not have to curve substantially in more than one direction, for example if the strip does not have to extend as close to the root and tip of the blade as is shown in FIG. 1, the rubber strip with the copper powder layer may be press-cured between two flat platens, then deformed around a mandrel having the desired profile, and then plated as described. The nickel plating, being relatively inflexible, will then hold the rubber strip in the desired shape.

The coating of copper powder is preferred over gauze and the like since, with powder, the pressing step can be made such as to leave the outer surface of the copper layer with a smooth shiny surface and correspondingly a smooth uniform plating of the nickel. The open texture of gauze however is reflected in the nickel plated layer which thereby becomes subject to a differential erosion in service. Also, it is more difficult to make gauze and the like conform to a shape which curves substantially in more than one direction. However, carbon cloth could be pre-woven to suit such a shape.

To reduce the problem of differential erosion when gauze or a perforated lamina is used, copper powder could be applied in addition so as to fill in the open texture of the gauze or lamina.

It will be seen that, although it does not have to be so, the illustrated rubber strip 4 has a uniform thickness, i.e. it is not made thicker at its leading edge region where most erosion occurs than at its flanks. Instead the greater erosion which occurs in this leading edge region is resisted by the nickel plating while the rubber strip itself can have substantially less thickness than would be required to give the edge protector a reasonable lifetime if the metal plating were not present. For example, the strip may have a thickness of say 0.030 inches. It may be found that there is an optimum ratio between the thickness and hardness of the rubber strip 4 and the thickness of the plating to give the best erosion protection. To achieve this optimum ratio in the different regions of the blade, it may be useful to so mould the rubber strip 4 that it does vary in thickness over these different regions.

It will be understood that, while there has been described a protective strip designed to prevent erosion or impact damage to a propeller blade, the invention is applicable to other devices and further includes a number of modifications of the described method. For example, instead of forming the edge protector as a separate article, a fibre glass propeller blade could be firstly sprayed with a coat of rubber/carbon mix, the gauze, copper powder, carbon cloth or the like applied by suitable fixture means and heat then applied to the assembly to cure the rubber. The whole blade can then be placed in an electro-plating bath and the plating process accomplished. The protective device could perform a dual function, for example it could be designed to act as a heater mat for an aircraft wing or other body by utilising the plated gauze or powder and rubber/carbon mix as part of an associated electrical circuit. For example, prior to curing, a shaped rubber member could be selectively covered with copper powder in the instance of an anti-icing pattern and plated to that shape to give both heat and erosion protection.

Furthermore, where the pressed-in layer comprises metal, it may be a metal other than copper. The plating may be of something other than nickel.

We claim:

1. A replaceable erosion-resistant cover for an airstream-exposed member, the cover comprising electrically conductive curable material having the elastically deformable nature of rubber and one surface of which has metal plating thereon and an opposite surface of which is pre-formed to at least nearly fit said member and is fixable thereto by adhesive, and the cover having been made by curing the curable material while pressing a discontinuously-surfaced layer of electrically conductive material onto said opposite surface of the curable material so that portions of the electrically conductive material protrude into the surface and then electro-plating the cured material over said layer.

2. A method according to claim 1, wherein said conductive material layer comprises a coating of metal particles.

3. An erosion resistant cover for the leading edge of a propeller blade, the member being made of curable electrically conductive elastically-deformable material having thereon metal plating and the member having been made by applying an electrically conductive material layer to a surface of said curable material, then pressing said layer onto said surface while curing the curable material, the layer having a discontinuous surface adjacent said surface of said curable material such that portions of the conductive material protrude into the curable material and the layer is bonded to the curable material, and then electro-plating the curable material over said layer.

4. A member according to claim 3, wherein said layer comprises a perforated metal lamina.

5. A member according to claim 3, wherein said layer comprises metal gauze.

6. A member according to claim 3, wherein said layer comprises carbon cloth.

7. A member according to claim 3, wherein said layer comprises a coating of metal powder.

8. A member according to claim 7, wherein said pressing is performed using a pressing member which leaves the layer with a smooth shiny surface.

9. A member according to claim 3, wherein the electro-plating includes applying a flash-plating of copper over said layer and then nickel-plating over the flash-plating.

10. A member according to claim 3, wherein, after said curable material is cured, it is deformed to a required shape and then said electro-plating is done.

11. A member according to claim 3, wherein the uncured material is deformed to a required shape and then cured and metal-plated.

12. A member according to claim 11, wherein said layer is applied to said surface when the material has been deformed to said required shape.

13. An erosion resistant cover according to claim 3 or 1, wherein said curable material is one selected from the group comprising natural rubber, synthetic rubber and plasticized resin each including an electrically conductive filler material.

14. An airstream-exposed member having a replaceable erosion resistant cover affixed by adhesive to a leading edge portion of the member to protect said portion from airstream induced erosion, said cover comprising a preformed strip of electrically conductive elastically deformable curable material which is metal plated and at least nearly fits said leading edge portion and which has been made by pressing a discontinuously surfaced layer of electrically conductive material onto the strip before it is cured so that portions of the electrically conductive material protrude into the strip and continuing said pressing while curing the strip, and by then electro-plating the strip over the layer of electrically conductive material.

15. A method of making a member for exposure to an airstream, in which method a replaceable pre-formed erosion resistant cover comprising a metal-plated strip of electrically conductive curable material having the elastically deformable nature of rubber is fitted to and adhesively fixed to the member to define the leading edge of the member, said cover having been made by curing the strip while pressing a discontinuously surfaced layer of electrically conductive material onto the strip so that portions of the electrically conductive material protrude into the strip, and by then electro-plating the strip over the layer of electrically conductive material layer.

16. A replaceable erosion resistant cover for the leading edge of a propeller blade, the cover comprising an elastically deformable inner layer and an outer layer of metal plated onto an outer surface of the inner layer, the cover being pre-shaped so that the inner surface of said inner layer at least nearly fits said leading edge and is attachable thereto by adhesive, and the cover having been made by:

providing a strip of curable electrically conductive material for forming, when cured, said elastically deformable inner layer;

applying to one surface of said strip a discontinuously surfaced layer of electrically conductive material;

pressing said strip and said discontinuously surfaced layer between shaped moulding members to press the discontinuously surfaced layer onto said one surface of said strip so that portions of said discontinuously surfaced layer protrude into said strip and become surrounded by the material of said strip, and to deform said strip so that the opposite surface thereof becomes shaped to at least nearly fit said leading edge;

curing the material of said strip while continuing said pressing so that said discontinuously surfaced layer becomes bonded to said strip and said strip retains the shape to which it is deformed; and electroplating said strip over said discontinuously surfaced layer to form said outer layer of metal.

17. A replaceable erosion resistant cover for the leading edge of a propeller blade, the cover comprising an elastically deformable inner layer and an outer layer of metal plated onto an outer surface of the inner layer, the cover being pre-shaped so that the inner surface of said inner layer at least nearly fits said leading edge and is attachable thereto by adhesive, and the cover having been made by:

providing a strip of curable electrically conductive material for forming, when cured, said elastically deformable inner layer;

applying to one surface of said strip a discontinuously surfaced layer of electrically conductive material;

pressing said discontinuously surfaced layer onto said one surface of said strip so that portions of said discontinuously surfaced layer protrude into said strip and become surrounded by the material of said strip;

curing the material of said strip while continuing said pressing so that said discontinuously surfaced layer becomes bonded to said strip; and providing said outer layer of metal by electro-plating said strip over said discontinuously surfaced layer while keeping said strip deformed to shape the surface thereof opposite said one surface to at least nearly fit said leading edge.

* * * * *